INVENTOR.
C. D. DOCKERY
BY Young & Quigg
ATTORNEYS 3,408,056
ARTICLE TRANSFER MECHANISMS
Calvin D. Dockery, Bartlesville, Okla., assignor to Phillips
Petroleum Company, a corporation of Delaware
Filed Nov. 23, 1966, Ser. No. 596,600
9 Claims. (Cl. 263—6)

ABSTRACT OF THE DISCLOSURE

Tubular articles are transferred from a first station, for instance, a heating wheel, to a second station, for instance a molding station. A gripping means having at least two jaws is inserted inside an end of one of these tubular articles and the jaws expanded to grip the tubular article from the inside. These jaws are attached to a rod which is slidably carried by a rotating collar. A cam means on this assembly engages a curved cam track; the mechanism is actuated and the cam following the cam track causes the rod to which is attached the gripping means to slide axially; thereafter, the rotatable collar turns thus rotating the rod, the gripping means, and the tubular article about an axis from the first station to the second station.

---

This invention relates to article transfer mechanisms. In one of its aspects it relates to an article gripping means and a means for moving the article gripping means such that an axis of the article is rotated about an angle.

In another of its aspects the invention relates to an apparatus for transferring a heated parison from a heating station to a second station whereby the transfer movement of the parison causes an indexing means to actuate the parison heater to supply a second parison to an area in which the parison is picked up and transferred.

In U.S. Ser. No. 472,393, filed July 1, 1965, now U.S. Patent No. 3,288,317, there is disclosed and claimed a method for producing a biaxially oriented article wherein parisons are extruded, cooled, and reheated. In this process, tubular parisons can be cut to desired lengths and reheated at a later time. In a mechanized operation wherein biaxially oriented bottles are blown, tubular parisons are heated in a circular wheel having a plurality of horizontal ports for the parisons. The present invention, in a principal embodiment, relates to a transfer mechanism for transferring the parisons from the heating device to a molding device. The invention also relates to an indexing means for moving the heating wheel synchronously with the movement of the transfer mechanism.

By various aspects of this invention, one or more of the following, or other, objects can be obtained.

It is an object of this invention to provide a transfer mechanism for transferring articles from a first station to a second station.

It is a further object of this invention to provide a method and apparatus for transferring heated parisons from a parison heater to a molding machine wherein the longitudinal axis of the parison is rotated about an angle in the transferring operation.

It is a still further object of this invention to provide a method and apparatus for synchronously moving or indexing a circular parison heating wheel with a transfer mechanism which transfers the parison from the heating station to the molding station.

Other aspects, objects, and the several advantages of this invention are apparent to one skilled in the art from a study of this disclosure, the drawings, and the appended claims to the invention.

According to the invention, there is provided an article transfer mechanism comprising an article gripping means and a gripping means transfer means wherein said article and gripping means are rotated through an angle from a first station to a second station. In one embodiment, an article is heated at a first station, withdrawn from the heating station and transferred to the second station. Further, there is provided a means for indexing the heating means with the gripping means transfer mechanism.

Figure 1:
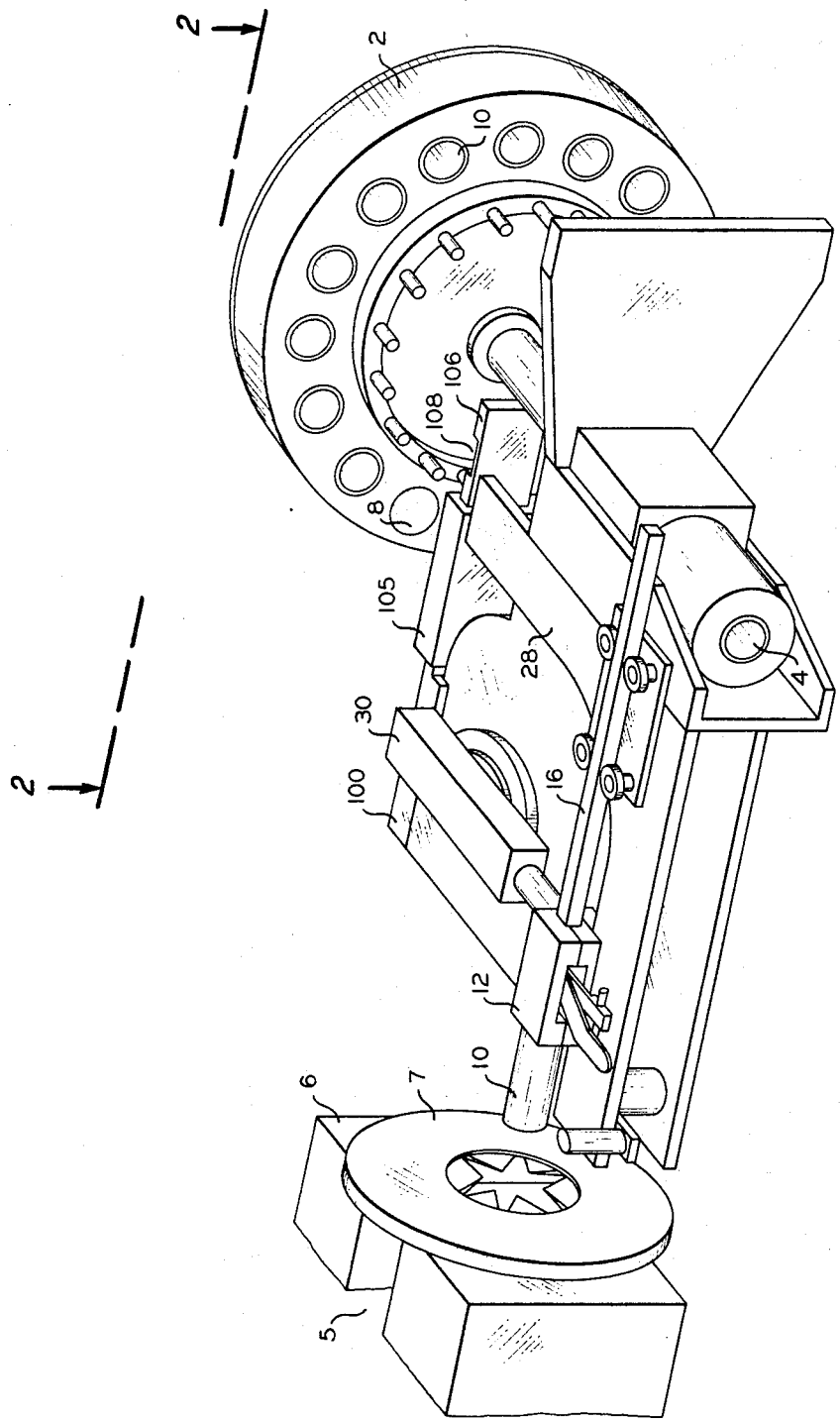
Figure 2:
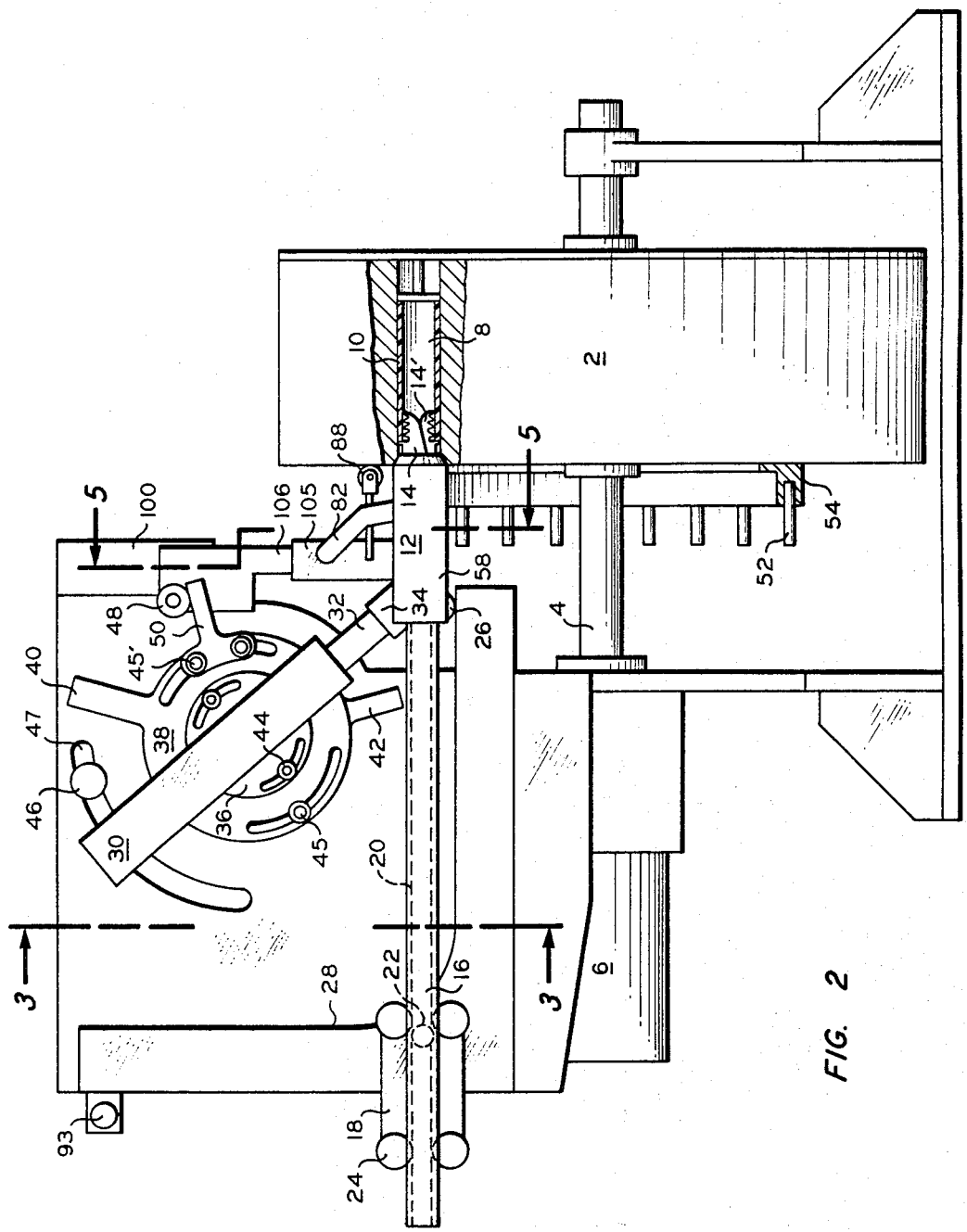
Figure 3:
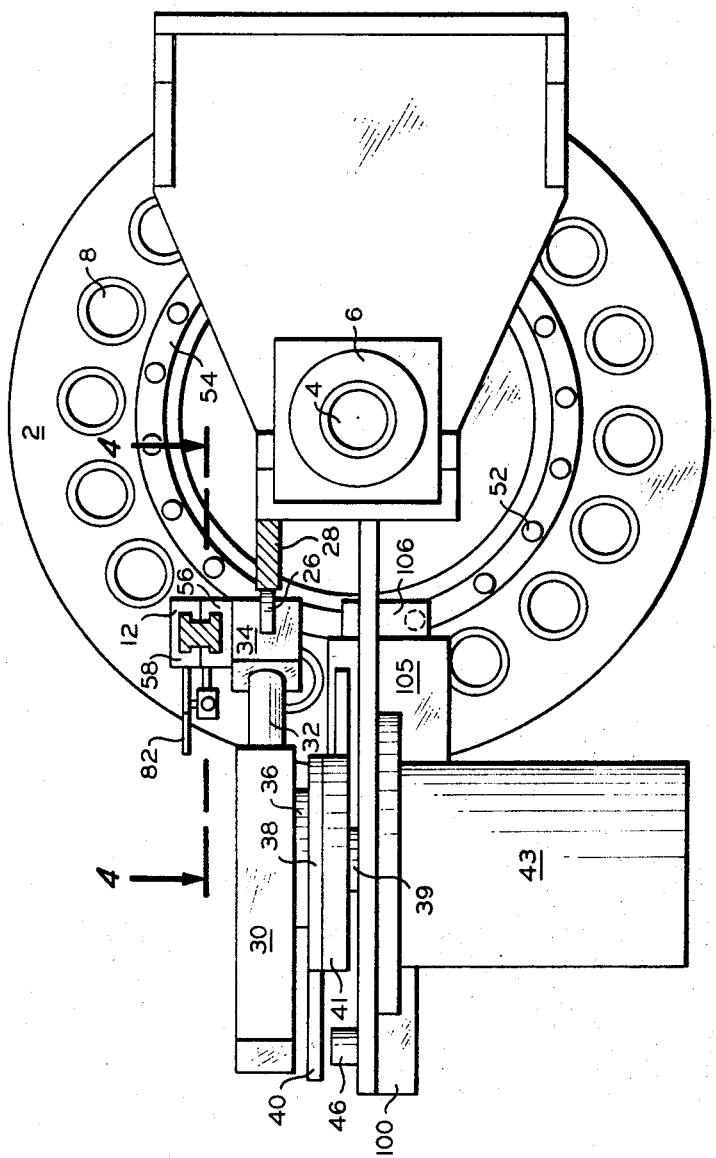
Figure 4:
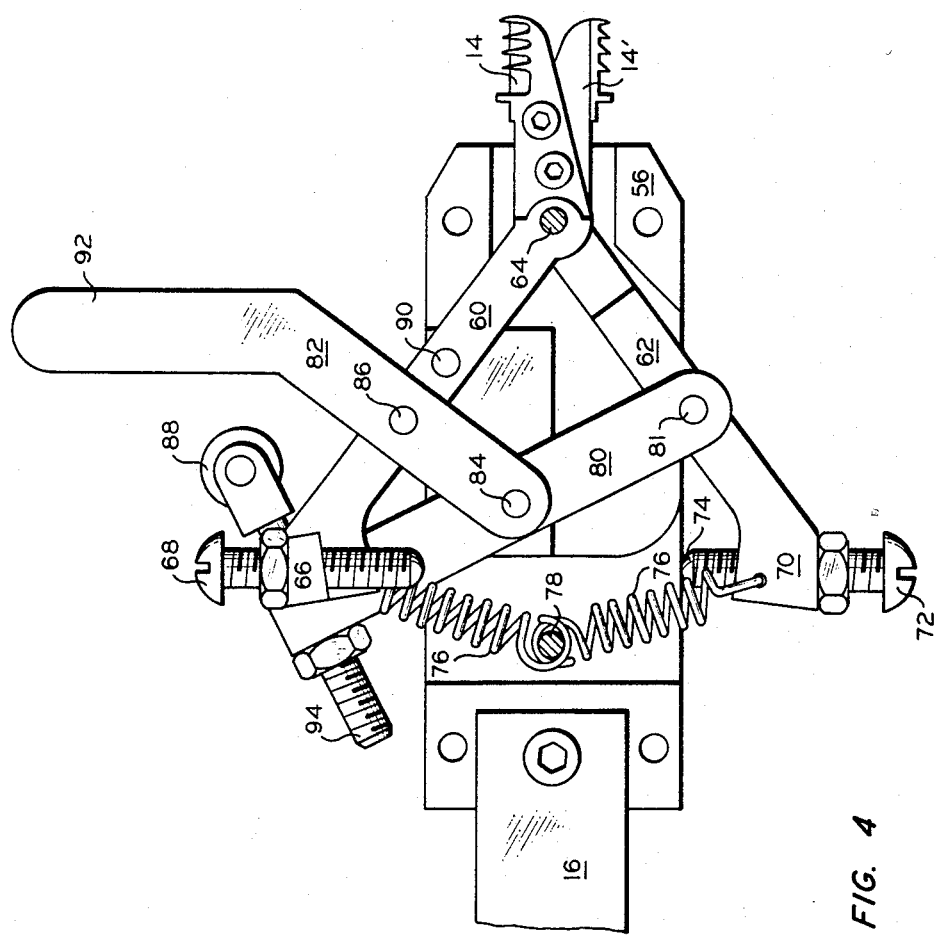
Figure 5:
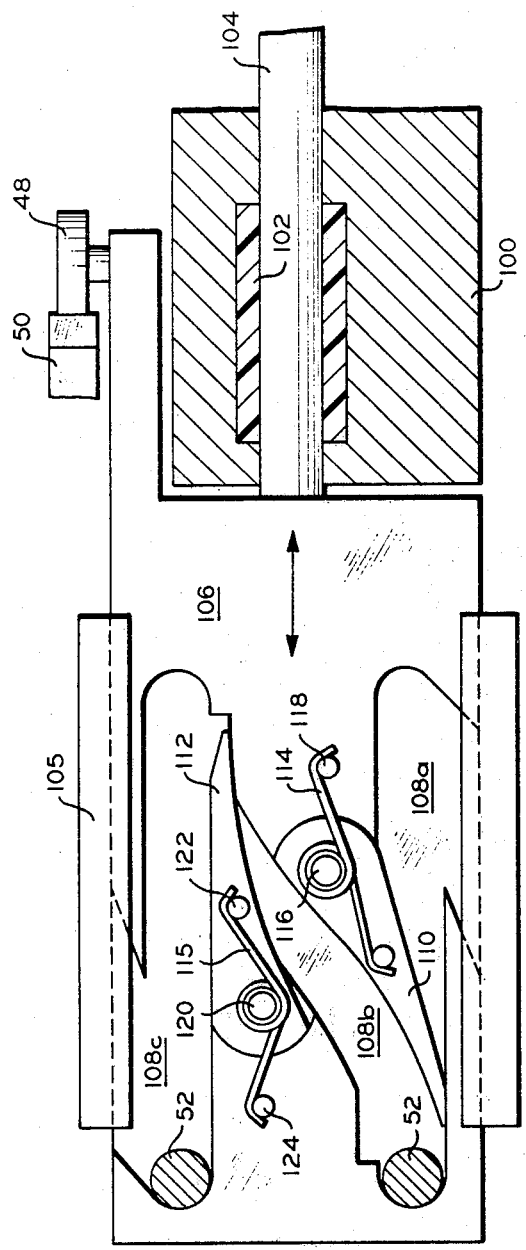

The invention will now be described with reference to the accompanying drawings in which FIGURE 1 is an isometric view of an apparatus which schematically shows an embodiment of the invention; FIGURE 2 is a top view partially in section of FIGURE 1; FIGURE 3 is a sectional view along lines 3—3 of FIGURE 2; FIGURE 4 is a sectional view along lines 4—4 of FIGURE 3; FIGURE 5 is a sectional view along lines 5—5 of FIGURE 2.

Referring now to the drawings, a plurality of tubular parisons 10 are heated in a plurality of holes 8 positioned horizontally in a rotatable circular wheel 2. Each parison, as it is brought to the proper temperature, is removed by gripping means 12 which moves the parison from the rotatable circular wheel 2 and inserts the same into aperture 5 of molding mechanism 6. In so doing the longitudinal parison axis is rotated about an angle of about 90°. The parison is then pinched off at one end thereof by suitable pinch-off device 7. A suitable pinch-off and molding device can be used such as that disclosed and claimed in copending application Ser. No. 489,934, filed Sept. 24, 1965.

The parison is then released by the gripping means 12 which then returns to rotatable circular heating wheel 2 to pick up another parison. In the meantime, the heating wheel 2 has rotated about axis 4 at least one notch so that another parison which has been temperature conditioned can be picked up and transferred to the molding operation.

Referring now specifically to FIGURES 2 and 3, a pair of gripping jaws 14, 14' having a plurality of raised ridges is inserted into the interior of parison 10. These jaws 14, 14' are actuated to expand outwardly thereby gripping the interior portion of parison 10. The actuation of jaws 14, 14' is by the contact of members 88 against the surface of circular heater 2 as will be hereinafter explained. Gripping means 12 has attached to the end opposite jaws 14, 14' a slotted rod 16 having slot 20 which is slidably positioned within collar 18 which in turn is rotatable about point 22. Collar 18 contains a plurality of rollers 24 which guide rod 16. Link 32 which is spring biased and telescoping within tube 30 is connected at 34 to gripping means 12. Rotatably attached to gripping means 12 at 34 is wheel 26 which follows track 28. Tube 30 is welded to plate 36 which in turn is attached by adjusting screws 44 to plate 38. Plate 41 is rotatably positioned on rotatable shaft 39 (see FIGURE 3) and is adjustably connected by adjusting screws 45 and 45' to plate 38. Shaft 39, fixedly attached by a key way (not shown) to plate 38, is actuated by an air cylinder (not shown) encased in casing 43. The air cylinder can by any suitable cylinder which rotates shaft 39 about a fixed angle during a first instance of time and back through the same angle in the opposite direction during a second instance of time. A suitable air cylinder is an Ex-Cell-O Corp. Model HN 36–IV Rotary Oscillating Torque Actuator. Tab 42 on plate 41 limits the rotation of shaft 39 by impinging against adjustable pin 46 which is positioned in slot 47. When gripping means 12 has transferred the parison 10 to molding mechanism 6, linkage 82 will strike bar 93, which can be attached to a frame, to actuate gripping jaws 14, 14' to contract to thereby release parison 10 as will be hereinafter described.

Tabs 40 of plate 38 and tab 50 adjustably attached to plate 38 by screws 45' contact roller 48 which is in turn attached to an indexing mechanism for circularly rotating the parison heater 2. A plurality of pins 52 attached through ring 54 coacts with the indexing means as will be hereinafter described.

Referring now to FIGURE 4, there is shown in detail the locking means for the jaws 14, 14' which are connected to supporting linkages 60 and 62 at 64 and are pivotable about pin 64, attached to gripper casing half 56. Supporting linkage 60 has attached at the other end thereof screw 68 at threaded aperture 66. The bottom portion of screw 68 bears against the top surface of gripper half casing 58 to thereby limit the extent to which the top jaw member 14 attached to the other end of linkage 60 can be moved away from the other jaw member 14'. Similarly, screw 72 attached to linkage 62 at 70 bears against the bottom surface of gripper half casing 56 at 74 to thereby limit the extent to which the other jaw member 14' attached to the other end of supporting linkage 62 can be moved away from jaw member 14. Springs 76 attached to pin 78 at one end thereof and to supporting linkages 60 and 62 at 66 and 70 at the other end thereof, respectively, spring bias the jaws 14 and 14' in the open or expanded position. Linkage 62 has pivotably attached thereto linkage 80 at pin 81. Linkage 80 is pivotably attached to linkage 82 at pin 84, which linkage 82 is also attached to supporting linkage 60 at pin 86.

In operation, when the parison is delivered to aperture 5, surface 92 of linkage 82 bears against rod 93 to thereby cause rotation of linkage 82 substantially about point 86 until linkage 82 at the bottom portion thereof is substantially parallel to linkage 80, the rotational motion of the two linkages being limited by pin 90 attached to supporting linkage 60. This rotation causes member 88 to project farther to the right (as seen in FIGURE 4) than surface 92 of linkage 82. The counterclockwise rotation of linkage 82 causes jaws 14 and 14' to be contracted to thereby release the parison 10. This position is the "closed" position for the jaws 14 and 14'. The gripping means 12 is then returned to the parison heating wheel and jaws 14 and 14' are inserted into another parison 10 at the heating wheel. During the insertion, member 88 bears against the surface of heating wheel 2 to thereby cause counterclockwise rotation of linkage 80 about point 81 and clockwise rotation of linkage 82 about point 86 to thereby expand jaws 14, 14' to contact the inner surface of parison 10. As can be seen from the drawing, member 88 is adjustably attached to linkage 80 through screw threads 94. Thus, the member 88 can be adjusted to make sure that the jaws 14, 14' are not expanded against the parison until they are inside the same.

Referring now to FIGURE 5 in which the indexing means are shown, roller 48 is connected to reciprocatable member 106 having Z-shaped grooves formed from channels 108a, b and c. Pins 52 are positioned within the grooves 108a, b, c of reciprocatable member 106 having a shaft 104 at the right end thereof insertable in a guiding slot in block 100. Member 106 slides in guide member 105. Bushings 102 which can be made of polytetrafluoroethylene or polyethylene or of the linear ball bushing type can be provided within the slot in block 100 to allow near frictionless reciprocation of rod 104 within the slot in block 100. Members 110 and 112, rotatably attached to reciprocating member 106 at 116 and 120, respectively, are spring loaded against the lower side of channels 108a and c by springs 114 and 115 which are attached at pins 118, 126 and pins 122 and 124, respectively.

In operation, a pin 52 moves into the lower right hand portion of chanel 108 as the tab 40 forces member 48 to push reciprocatable block 106 toward the left. When tab 50 forces member 48 to move block 106 to the right, pin 52 slides down channel 108a past member 110 to the left portion of channel 108a. The left end of channel 108a contacts pin 52, stopping the movement of block 106. During the subsequent movement toward the left of block 106, under the action of tab 40, pin 52 is forced up through channel 108b past spring loaded member 112 and is contacted by the right end of channel 108c, thereby causing rotation of the circular parison heater through one step. This rotation of the parison heater through one step causes another pin 52 to enter the lower portion of channel 108. During the next movement toward the right of reciprocatable member 106, pins 52 move to the left portion of channel 108c. In this manner the tubular parison heating wheel is indexed or synchronously rotated as the parison is transferred from the circular heating wheel 2 to the molding machine 5. Also, the heating wheel is held in position by pins 52 resting against the ends of channels 108c and 108a, respectively, during the insertion and removal of the parisons.

Whereas the invention has been described with reference to the reciprocatable block 106 having channels 108a, 108b and 108c as reciprocatable in block 100 and pins 52 as being attached to rotatable circular heating wheel 2, it is obvious that the pins could be reciprocatable or stationary on block 100 and the reciprocatable member 106 having channels 108a, 108b and 108c could be placed either stationary or reciprocatable on heating wheel 2. In this latter instance, a plurality of members 106 having a continuous channel would be required to be placed around the wheel as are pins 52.

Other variations and modifications such as placing surface 92 on the bottom portion of linkage 80 and/or attaching member 88 to the bottom portion of linkage 82 are possible within the scope of the foregoing disclosure, the drawings and the claims to the invention without departing from the spirit thereof.

I claim:

1. A transfer means for tubular articles comprising in combination: a gripping means comprising at least two jaws adapted to fit inside said tubular article, said jaws being adapted to expand against the inner surface of said tubular article; supporting linkages for said jaws, each of said supporting linkages connected at one end to its respective jaw and diverging at the other end thereof, said connecting linkages being biased so that said jaw means is biased open; locking means connecting said connecting linkages to lock said jaw means is closed position away from contact with said surface of said tubular article; and means to move said gripping means carrying said article axially and thereafter to rotate an axis of said article through an angle from a first station to a second station.

2. An apparatus according to claim 1 wherein said locking means comprises a first linkage attached to one of said supporting linkages, a second linkage attached to said other of said supporting linkages and to said first linkage, a pin on at least one of said first and second linkages to limit the relative rotation of said linkages with regard to one another such that when said supporting linkages are divergent said first and second linkages are substantially parallel and rest against said pin to lock said supporting linkages in divergent position, thereby locking said jaws closed.

3. An apparatus according to claim 2 wherein there is provided a means to actuate said locking means to closed position, said actuating means for said locking means being attached to said second linkage and being actuated by contacting a surface at said second station, and a means to unlock said locking means to cause said jaws to be biased open, said unlocking means being attached to said second linkage.

4. An apparatus according to claim 1 wherein there is provided a means to actuate said locking means to closed position and a means to unlock said locking means to cause said jaws to be biased open.

5. A transfer means for tubular articles comprising in combination: a gripping means comprising at least two jaws adapted to fit inside said tubular article, said jaws being adapted to expand against the inner surface of said tubular article; a gripping means support means comprising a rotatable collar, and a rod attached to said gripping means at one end, said rod slidably connected to said rotatable collar, said collar being adapted to rotate about an axis perpendicular to the direction of movement of said rod; guide means in the form of a curved cam track; follower means on said transfer means to follow said cam track; means to actuate said transfer means thus causing said rod carrying said gripping means to slide axially and thereafter to rotate through an angle about said axis so as to guide said gripping means from said first station to said second station; means to cause said jaws to expand at said first station; and means to cause said jaws to contract at said second station.

6. An apparatus according to claim 5 wherein said means to actuate said gripping means comprises an air cylinder, a rotatable shaft actuated by said air cylinder, telescoping means attached to said rotatable shaft at one end and to said gripping means at the other end thereof, and means to limit the rotation of said rotatable shaft.

7. A transfer means for tubular articles comprising in combination: a gripping means comprising at least two jaws adapted to fit inside said tubular article, said jaws being adapted to expand against the inner surface of said tubular article; a gripping means transfer mechanism; a first station comprising a rotary heating means having a plurality of apertures in which said articles are heated; an indexing means connected to said transfer means and said rotary heating means to rotate said heating means when said transfer means is actuated; a second station comprising a molding mechanism; and means to actuate said gripping means transfer mechanism to move said article axially and thereafter to rotate an axis of said article through an angle from first station to said second station.

8. An apparatus according to claim 7 wherein said indexing means comprises reciprocatable means, a plurality of indexing protrusions on one of said rotary wheel and said reciprocatable means, the other of said reciprocatable means and said indexing protrusions having a first channel, a second channel parallel to said first channel and parallel to the line of motion of said reciprocatable member, connecting channel from the bottom of said first channel to the top of said second channel, said reciprocatable means being so disposed with regard to said indexing protrusions as said indexing protrusions fit into said channels to move from said first channel through said connnecting channels to said second channel as said reciprocatable member is reciprocated to thereby rotate said rotatable heating means about an angle which movement moves said apertures at least one position so that a different article is in front of said gripping means, and means in said first channel and said connecting channel to allow said protrusions to pass in one direction from said first channel to said second channel and to prevent said protrusions from moving in a direction from said second channel to said first channel.

9. An apparatus according to claim 8 wherein said means to actuate reciprocatable motion of said reciprocatable member comprises a first tab connected to a rotatable shaft which actuates said gripping means transfer mechanism and a second tab connected to said rotatable shaft.

References Cited
UNITED STATES PATENTS

| | | | |
|---|---|---|---|
| 410,108 | 8/1889 | Kennedy et al. | 263—7 |
| 2,775,440 | 12/1956 | Young | 263—7 |

JOHN J. CAMBY, *Acting Primary Examiner.*